D. EDGAR.
Gate.
No. 202,422. Patented April 16, 1878.
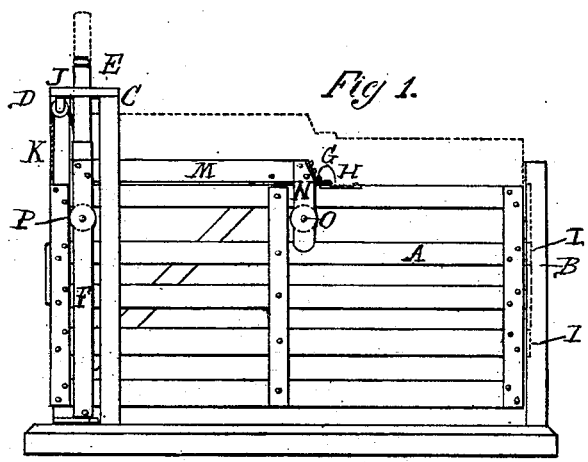
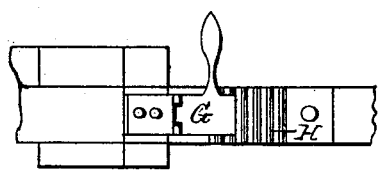
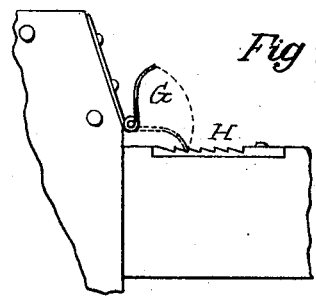
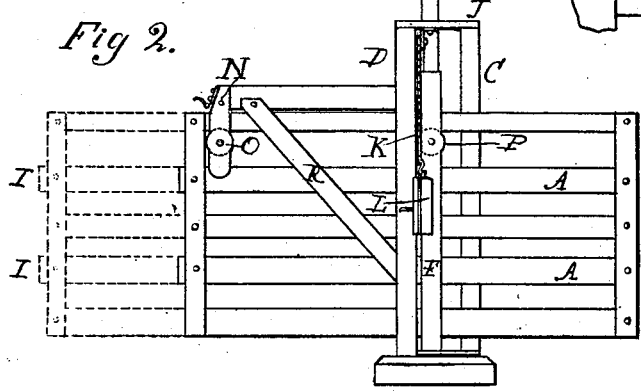
Witnesses.
M. Gardner
A. Scott
Inventor.
Daniel Edgar
by atty,
Deskett C. Allen.

UNITED STATES PATENT OFFICE.

DANIEL EDGAR, OF ADRIAN, MICHIGAN.

IMPROVEMENT IN GATES.

Specification forming part of Letters Patent No. 202,422, dated April 16, 1878; application filed March 4, 1878.

*To all whom it may concern:*

Be it known that I, DANIEL EDGAR, of Adrian, in the county of Lenawee and State of Michigan, have invented certain new and useful Improvements in Gates; and I do hereby declare the following to be a full, clear, and exact description of the same, reference being made to the accompanying drawing, forming a part of this specification, and in which—

Figure 1 is a side elevation of my improved gate. Fig. 2 is a view of the gate when moved backward and swung open. Fig. 3 is a top or plan view of the catch and rack for holding or securing the gate when closed. Fig. 4 is an enlarged side elevation of the same.

This invention relates to improvements in the class of sliding swinging gates; and the invention consists in the combination, with a sliding swinging gate and bar connected therewith, of a catch and rack for securing the gate in a closed position, whether in an elevated or its original position, all as will be hereinafter fully described.

In the drawing, A represents the gate or the panels thereof, and B the post against which the gate closes, said post being provided on its inner edge with a groove for the reception of the ends I of the panels of the gate when closed.

C D represent the diagonally-arranged posts, connected together at their upper ends by a cross-piece, J, which is provided with a central hole, through which the rounded upper end E of the pivoted upright F plays vertically in raising or lowering the gate, said gate being raised and lowered by means of the cord K and weight L.

When it is desired to elevate the gate to avoid snow-banks, or to permit small animals to pass through without permitting larger animals, the gate is simply elevated the required distance, and sustained by means of the weight, the end of the panels of the gate sliding upward in the groove of the post B, said gate being held in an elevated or its original position by means of the catch G and rack H, as clearly shown in Fig. 1.

M represents a bar secured to the upright F, and to which the pendant N is secured, said pendant extending downward below the roller O, forming a guide, and laterally supporting the panel A of the gate. P represents a roller journaled to the upright F, the upper panel of the gate sliding upon the rollers O P.

When it is desired to open the gate, it is moved backward upon the rollers and swung around on the pivoted upright F, all as clearly shown in Fig. 1.

The action of the catch G and rack H is the same in securing the gate when closed, either in an elevated or its natural position, and its operation, being independent of the cord and weight, is not interfered with.

The cord K passes over a pulley attached to the cross-piece J of the gate, as clearly shown in Fig. 1.

The bar M is braced by means of the diagonal bar R, secured to the lower end of the upright F, and its upper end to the bar M.

Having thus fully described my invention, what I claim, and desire to secure by Letters Patent, is—

The combination, with the sliding swinging gate and bar M, connected therewith, of the catch G and rack H, for securing the gate, whether in an elevated or its natural closed position, substantially as specified.

DANIEL EDGAR.

Witnesses:
J. KETCHEM,
M. CHEATEM.